United States Patent [19]
Kim et al.

[11] Patent Number: 5,986,725
[45] Date of Patent: Nov. 16, 1999

[54] LIQUID CRYSTAL DISPLAY AND METHOD FOR FABRICATING THE SAME

[75] Inventors: Woong-Kwon Kim; Jeong-Hyun Kim, both of Anyang-si, Rep. of Korea

[73] Assignee: LG Electronics, Inc., Seoul, Rep. of Korea

[21] Appl. No.: 08/996,424

[22] Filed: Dec. 22, 1997

[30] Foreign Application Priority Data

Apr. 10, 1997 [KR] Rep. of Korea ...................... 97-13209

[51] Int. Cl.⁶ .......................... G02F 1/1343; G02F 1/136; G02F 1/1333; G02F 1/13
[52] U.S. Cl. ................................. 349/43; 349/38; 349/41; 349/158; 349/187
[58] Field of Search .................................. 349/43, 38, 41, 349/42, 158, 178; 257/57

[56] References Cited

U.S. PATENT DOCUMENTS

5,614,728  3/1997  Akiyama ..................................... 257/57
5,852,488  12/1998  Takemura ................................. 349/187

Primary Examiner—William L. Sikes
Assistant Examiner—Julie Ngo
Attorney, Agent, or Firm—Morgan, Lewis & Bockius LLP

[57] ABSTRACT

A liquid crystal display has a plurality of parallel gate lines and a plurality of parallel data lines formed orthogonal to the gate lines, and a gate insulating layer disposed therebetween. An insulating layer is formed on the entire surface inclusive of the data lines. The insulating layer has void regions at least on one edge of each of the data lines in the same direction with the data line. A pixel electrode is formed on the insulating layer.

18 Claims, 7 Drawing Sheets

LIQUID CRYSTAL DISPLAY AND METHOD FOR FABRICATING THE SAME

This application claims the benefit of application Ser. No. 13209/1997, filed in Korea on Apr. 10, 1997, which is hereby incorporated by reference.

BACKGROUND OF THE INVENTION

1. Field of the Invention

The present invention relates to a liquid crystal display, and more particularly to a liquid crystal display and a method for fabricating the same, in which a dielectric constant of an insulating film disposed between signal lines is minimized to prevent coupling.

2. Discussion of the Related Art

In general, the liquid crystal display includes two sheets of glass plate disposed opposite to each other and a liquid crystal sealed between the glass plates. A bottom plate has a matrix of data lines and gate lines, and thin film transistors and pixel electrodes disposed at crossing points of the data lines and the gate lines, and a top plate has common electrodes and R, G, B color filter layers. The liquid crystal is injected between the bottom and top plates, which are then inserted between polarizing plates, to make a transmissive liquid crystal display.

Figure 1:
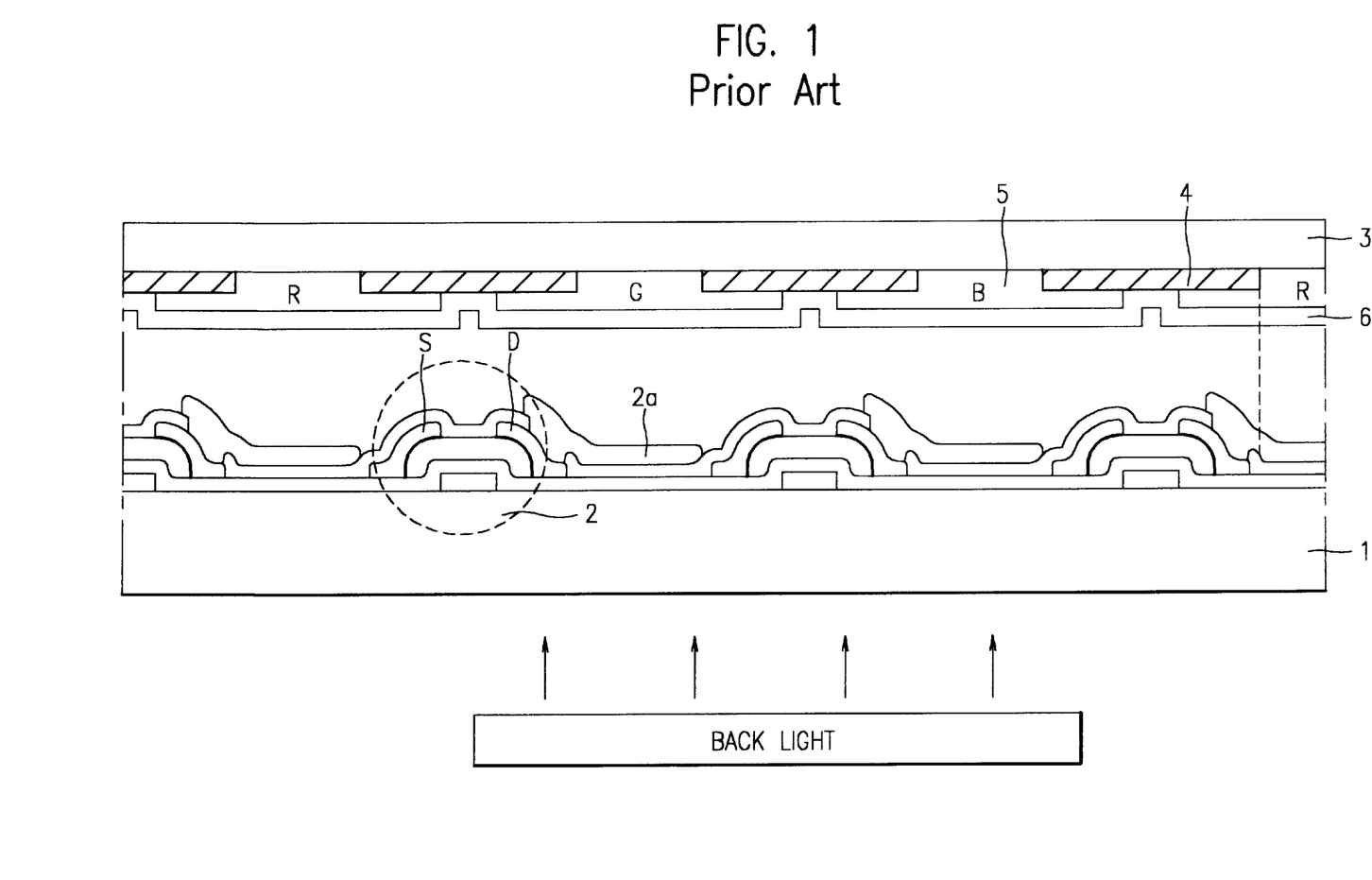
FIG. 1 illustrates a section of a conventional liquid crystal display.

In detail, the bottom plate includes a plurality of parallel gate lines spaced apart a certain distance from each other on a transparent substrate, such as glass or quartz, and a plurality of parallel data lines arranged orthogonally to the gate lines, spaced apart a certain distance from each other. Each pixel region has a pixel electrode and a thin film transistor that utilizes the gate line as its gate electrode and the data line as its source electrode for applying a signal on the data line to the pixel electrode in response to a signal on the gate line. That is, as shown in FIG. 1, the bottom plate 1 includes thin film transistors, spaced apart a certain distance from each other, formed thereon each having a gate electrode G connected to the gate line, a source electrode S connected to the data line and a drain electrode D. Each of the pixel regions has a pixel electrode 2a, formed therein, connected to the drain electrode D of the thin film transistor 2. The top plate 3 includes black matrix layers 4 in the form of a net, formed thereon, for blocking the transmission of light, in respective portions, excluding the pixel electrodes 2a formed on the bottom plate 1. R, G, B color filter layers 5 are formed thereon, between the black matrix layers 4. Common electrodes 6 extend to the color filter layers 5 and the black matrix layers 4.

Besides the aforementioned transmissive type liquid crystal display, there is a reflective type liquid crystal display, which utilizes environmental lights, including a light reflective plate of an aluminum membrane attached onto the back of the bottom plate for reflecting incident light out through the top plate for displaying. In modes, such as a TN (Twisted Nematic) or STN (Super Twisted Nematic), the polarizing plate and a checkered plate, forming a reflective plate, are attached to each other and overlap. In general, in a typical application the reflective type is only a monochromic display, and a reflective color display having the color filter applied thereto exhibits a problem in that the display not only is dim, but also has poor color quality.

Figure 2:
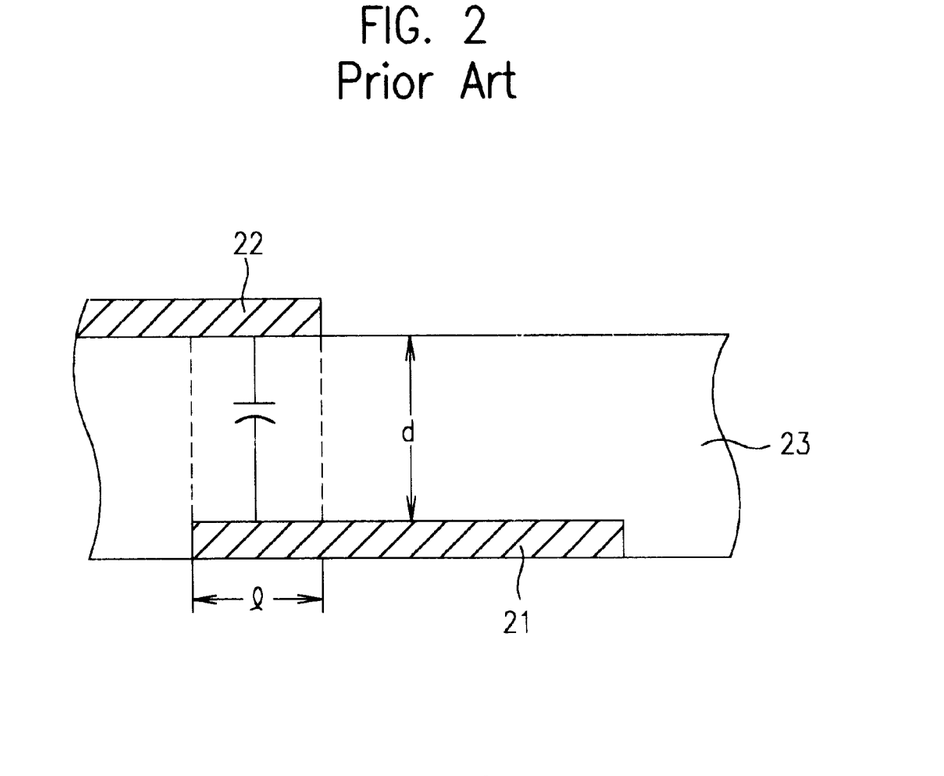
FIG. 2 illustrates a parasitic capacitance between signal lines in the conventional liquid crystal display.

As illustrated in FIG. 2, the structure of conventional liquid crystal displays suffers from parasitic capacitance between signal lines, such as between a data line and a pixel electrode.

An insulating film 23, which acts as a dielectric, is disposed between a first conductor 21 and a second conductor 22 that overlap each other a distance l. A static capacitance C between the two conductors can be expressed with the following equation.

$$C = \epsilon_\gamma \epsilon_o \frac{S}{d} \quad (1)$$

Where $\epsilon_{65}$ is a relative dielectric constant, $\epsilon_o$ is a dielectric constant in vacuum (i.e., $\epsilon_o=1$), S represents an overlapped area of the two conductors (I x w), and d is a distance between the two conductors.

For example, if the distance d between the two conductors is 2 $\mu$m, the width w of the conductor is 2 $\mu$m, and an insulating film with a relative dielectric constant $\epsilon_{\gamma=}3.0$ is applied, the static capacitance between the two conductors will be as follows.

$$C = 3\epsilon_o \frac{2 \times l}{2} = 3\epsilon_o l \quad (2)$$

It follows from equations (1) and (2) that to minimize the static capacitance formed between the two conductors, a material having a small relative dielectric constant $\epsilon_\gamma$ should be used, the distance d between the two conductors should be made as large as possible, or the overlapped areas between the two conductors should be made as small as possible.

However, the structure of a conventional liquid crystal display limits the degree of control over these parameters. First, control over the value of the dielectric constant of the insulating film is limited by the choice of suitable materials. Second, when the insulating film is formed of an inorganic material, the problems of deposition rate and pattern formation become critical. If the insulating film is formed of an organic material fabrication problems arise, such as focusing and limitation in the pattern size.

SUMMARY OF THE INVENTION

Accordingly, the present invention is directed to a liquid crystal display and a method for fabricating the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the liquid crystal display, having a plurality of parallel gate lines and a plurality of parallel data lines, formed orthogonally to the gate lines, with a gate insulating layer disposed therebetween, includes an insulating layer formed on the entire surface inclusive of the data lines, the insulating layer has void regions at both edges of each of the data lines, in the same direction with the data line, and a pixel electrode formed on the insulating layer.

In another aspect of the present invention there is provided a method for fabricating a liquid crystal display including the steps of forming a plurality of parallel gate lines, inclusive of gate electrodes, forming a gate insulating layer on the entire surface, inclusive of the gate electrodes, forming a semiconductor layer and an n$^+$ layer on the gate insulating layer in succession. The steps also include forming a plurality of parallel data lines in a direction vertical to the gate lines, forming removable lines at the edges of the data line, forming an insulating layer on the entire surface, inclusive of the removable lines, removing the removable lines to form void regions in the insulating layer, and forming a pixel electrode on the insulating layer.

In still another aspect of the present invention a method for fabricating a semiconductor device for preventing coupling between two conductors, the method including the steps of patterning a first conductor on a substrate, forming an insulating layer including an insulating film and a void region on the first conductor, and forming a second conductor on the insulating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to a liquid crystal display embodying the principles of a preferred embodiment of the invention, examples of which are illustrated in the accompanying drawings.

Figure 3:
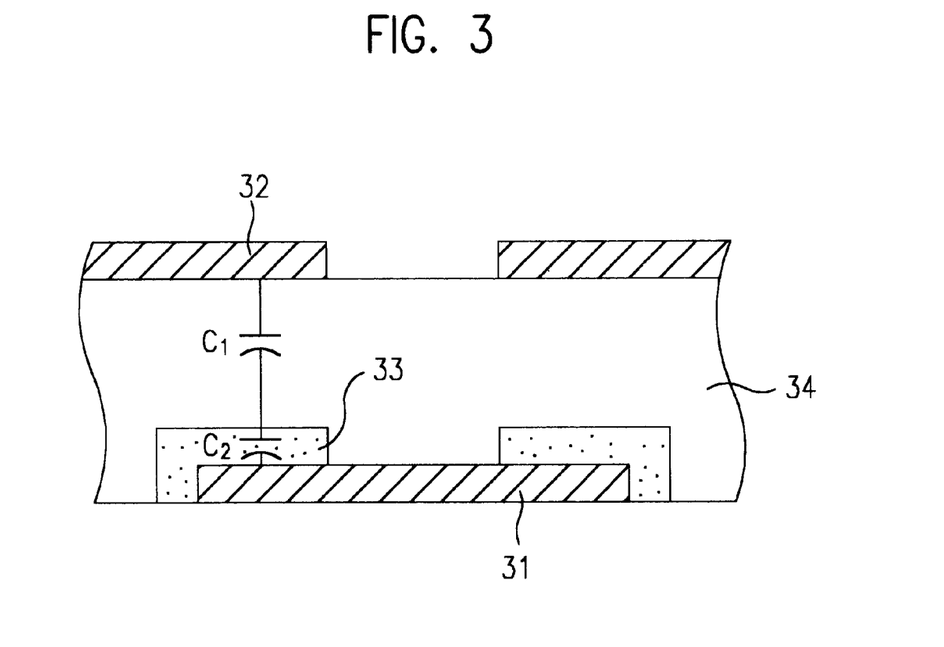
FIG. 3 schematically illustrates a preferred embodiment of a liquid crystal display structure.

Referring to FIG. 3, the liquid crystal display includes an insulating layer, formed both of a region 33 filled with air and an insulating film 34, between a first conductor 31 and a second conductor 32. In general, the relative dielectric constant of air is a value close to unity. Though it is required to have an insulating film having a low dielectric constant for preventing coupling between two overlapped conductors in a highly integrated circuit, no insulating material has a dielectric constant lower than air. Therefore, in the liquid crystal display of the invention, an insulating film of air is disposed in the region, where the capacitive coupling is formed by the overlap of two conductors, to prevent the coupling. In this structure, where a portion of the insulating film between the two conductors is formed of air, a static capacitance between the first conductor 31 and the second conductor 32 can be expressed as follows.

$$C = \frac{C_1 \times C_2}{C_1 + C_2} = \frac{3\epsilon_o \times 2l \times \epsilon_o \times 2l}{3\epsilon_o \frac{2l}{1\ \mu m} + \epsilon_o \frac{2l}{1\ \mu m}} = \frac{12\epsilon_o^2 l^2}{8\epsilon_o l} = \frac{3}{2}\epsilon_o l \quad (3)$$

Thus, an insulating layer formed either of an insulating film and air or the insulating film and a vacuum is provided between the first conductor and the second conductor for preventing capacitive coupling between the two conductors in a general semiconductor device. The insulating layer formed either of an insulating film and air or the insulating film and a vacuum is applicable not only to a semiconductor device, but also to a liquid crystal device.

An application of the insulating layer formed either of an insulating film and air or the insulating film and a vacuum to a method for fabricating a liquid crystal display will be explained in detail with reference to the attached drawings. FIGS. 4a–4d illustrate layouts showing the steps for fabricating a liquid crystal display in accordance with a preferred embodiment of the present invention and FIGS. 5a–5d and 6a–6b illustrate section across lines 5a–5a', 5b–5b', 5c–5c', 5d–5d', 6a–6a', and 6b–6b'of FIGS. 4a–4d', respectively.

Figure 4A:
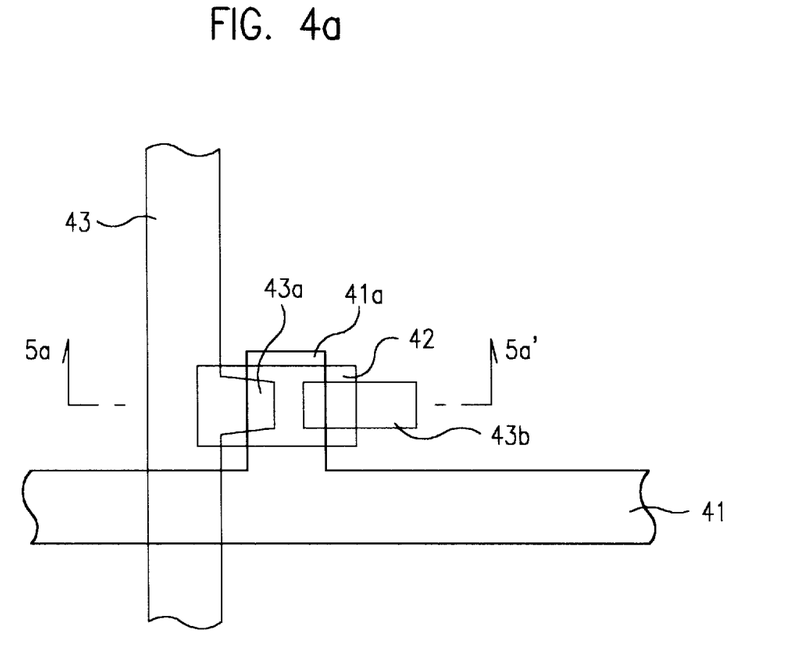
FIGS. 4a–4d illustrate layouts showing the steps for fabricating the liquid crystal display of FIG. 3.
Figure 5A:
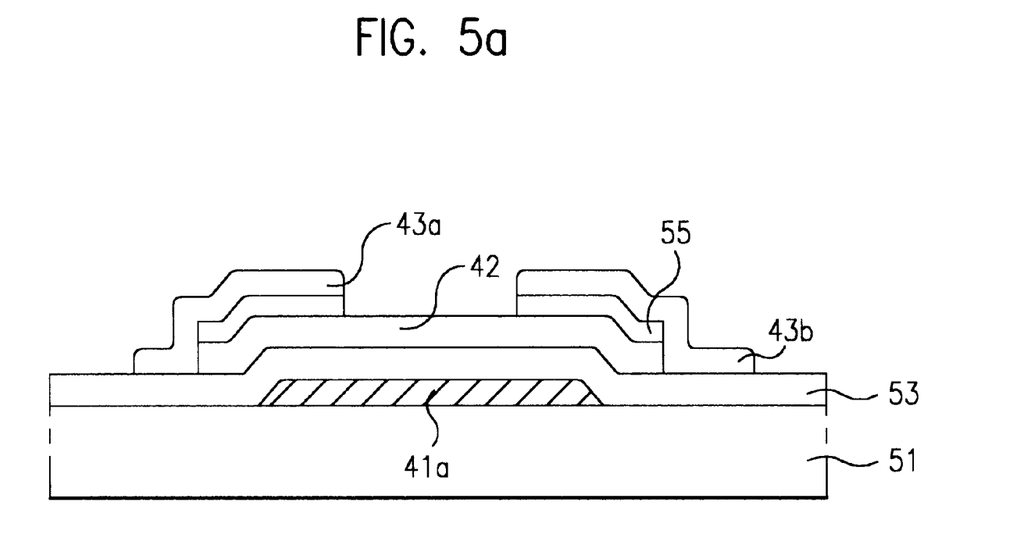
FIGS. 5a–5d illustrate sections across lines 5a–5a', 5b–5b', 5c–5c', 5d–5d' of FIGS. 4a–4d, respectively; and, FIGS. 6a and 6b illustrates sections across lines 6a–6a' and 6b–6b', respectively, of FIG. 4d.

Referring to FIGS. 4a and 5a, a plurality of parallel gate lines 41 each inclusive of a gate electrode 41a are formed on an insulating substrate 51. Then, a gate insulating layer 53, a semiconductor layer 42 and an n+ layer 55 are formed in succession on the entire surface of the insulating substrate 51, inclusive of the gate lines 41 and gate electrode 41a, and the semiconductor layer 42 and the n⁺ layer are subjected to patterning enough to cover the gate electrodes 41a. A material for forming source and drain electrodes is deposited on the entire surface, inclusive of the n⁺ layer, and subjected to patterning to form data lines 43 and source/drain electrodes 43a, 43b. The source/drain electrodes 43a, 43b are used as masks in patterning and in separating the underlying gate insulating layer 53 from the semiconductor layer 42.

Figure 4B:
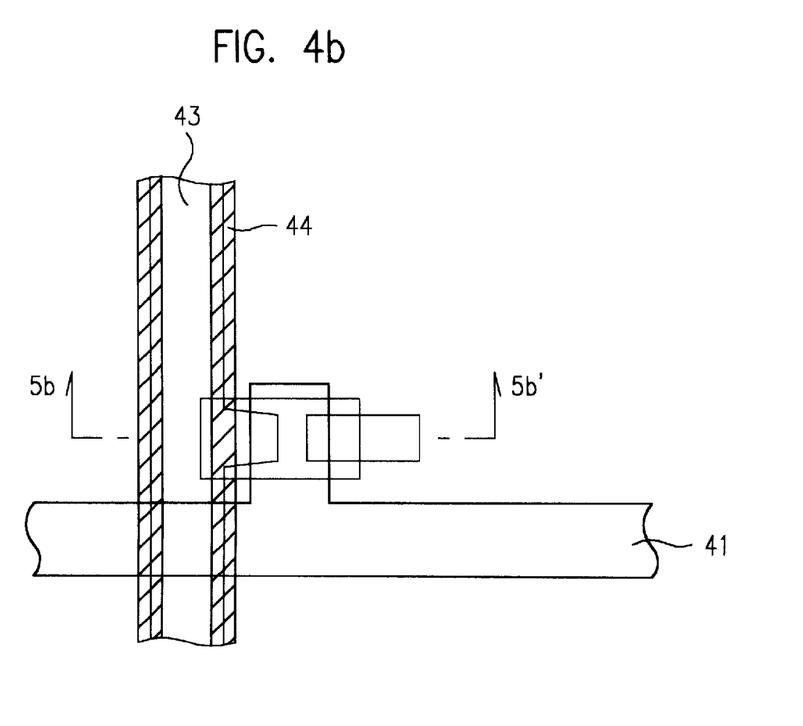
Figure 5B:
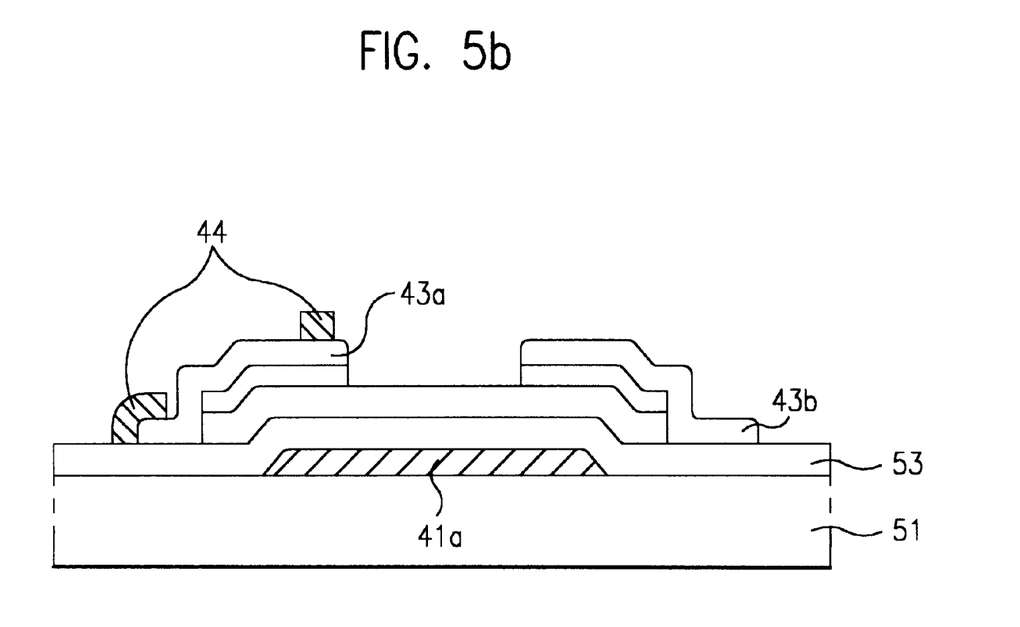

As shown in FIGS. 4b and 5b, removable lines 44 spaced apart a certain distance are deposited on the source electrodes 43a. In the illustrated embodiment, the removable lines are formed of metal, but may alternatively be formed of a non-conductor, or of any material not reactive to gas but removable in reaction to a liquid.

Figure 4C:
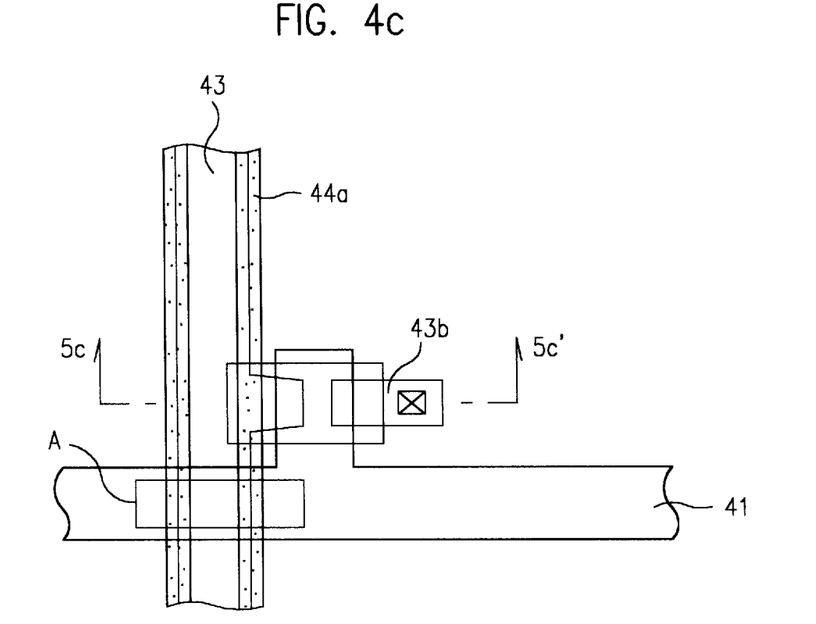
Figure 5C:
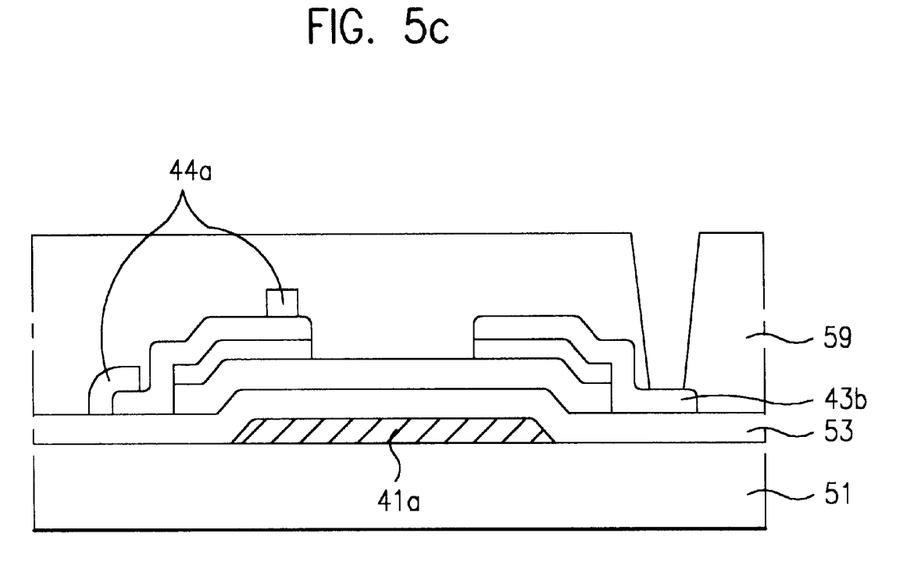

As show in FIGS. 4c and 5c, a passivation film 59 is deposited on the entire surface, inclusive of the removable lines 44, and connection holes are formed therein to open a predetermined surface of each of the drain electrodes 43b. Portions of the passivation film are selectively removed in a region "A" about the point, at which the gate lines 41 and the data lines 43 cross. This permits injection of an etchant into region A to remove the removable lines 44. By injecting etchant into region A only the removable lines 44 are removed, forming voids 44a in the passivation film. In the removal of the removable lines 44, wet etching is employed.

Figure 4D:
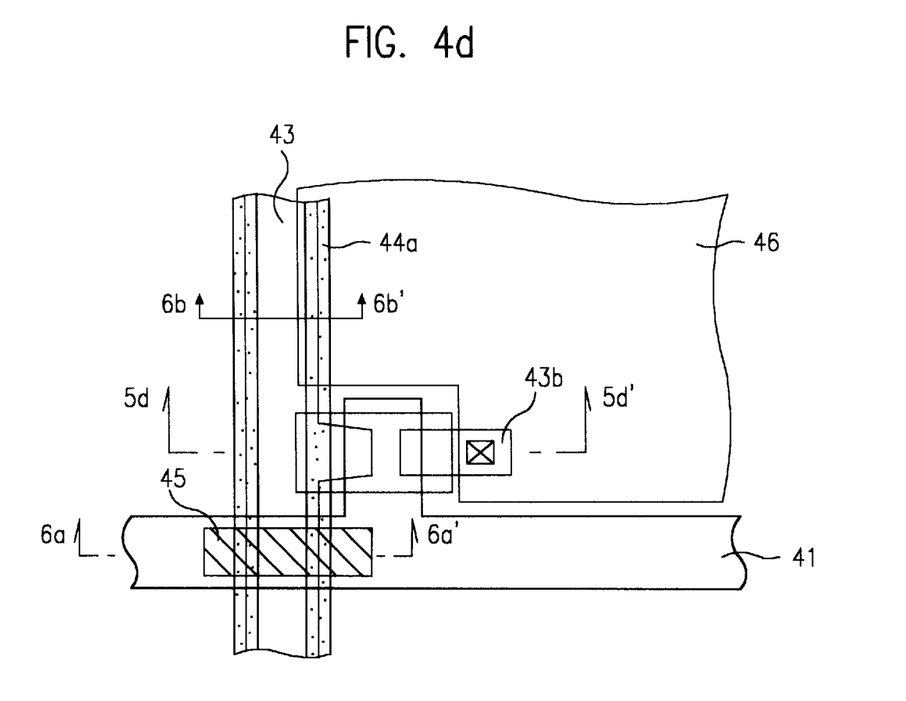
Figure 5D:
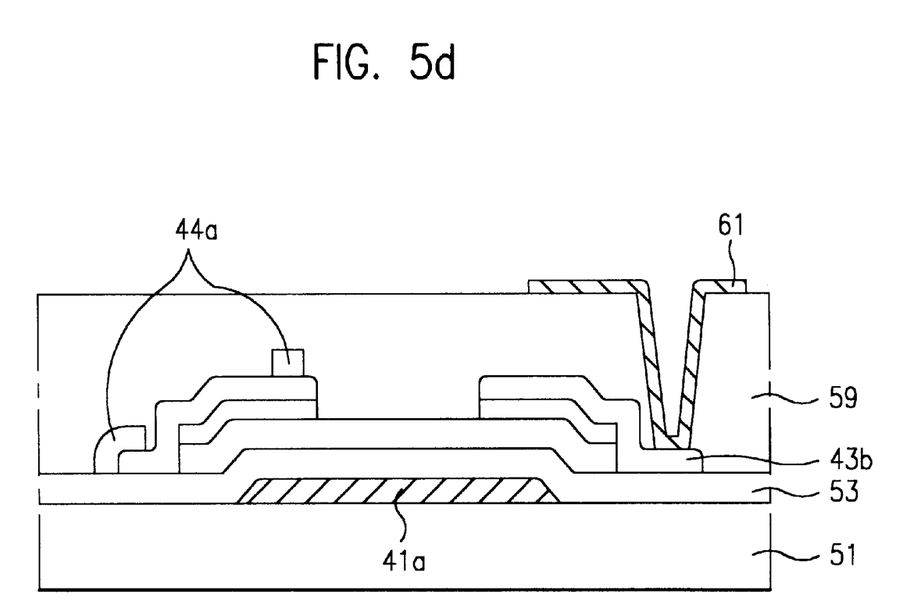

Then, as shown in FIGS. 4d and 5d, a thin film 45 is formed to cover region A. This prevents a liquid from being injected into the void 44a through region A in a later processing step. The thin film 45 may be formed of a conductor, a non-conductor, a nitride or an oxide. In the disclosed embodiment, film 45 is ITO, and is formed at the same time as pixel electrode 46, which is formed on the entire surface, inclusive of the passivation film connected to the drain electrodes 43b, through the connection holes. Alternatively, thin film 45 may be formed as a second passivation film applied to passivation film 59, rather than being formed of ITO. The thin film need not be formed if the etchant is not to be used in a latter process or there is no effect from the etchant.

Figure 6A:
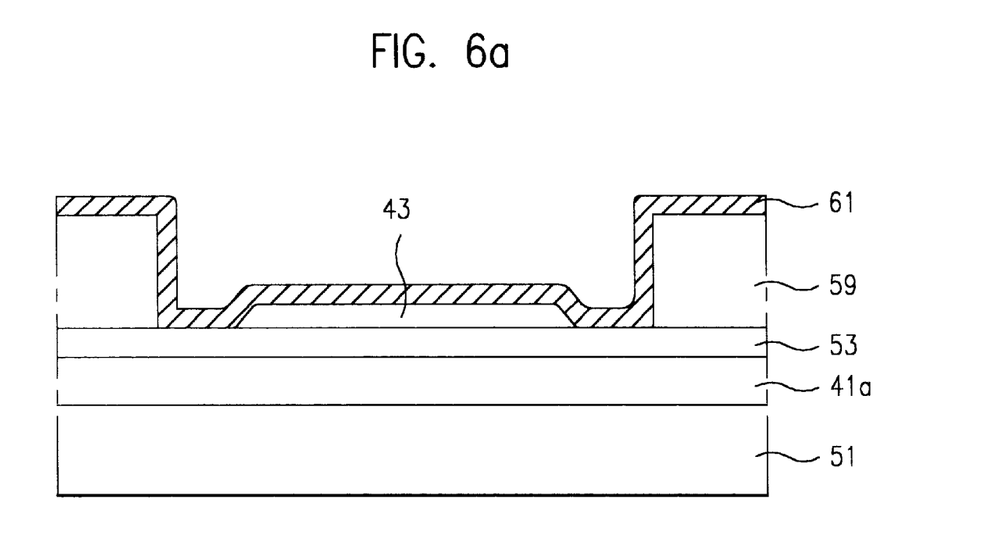
Figure 6B:
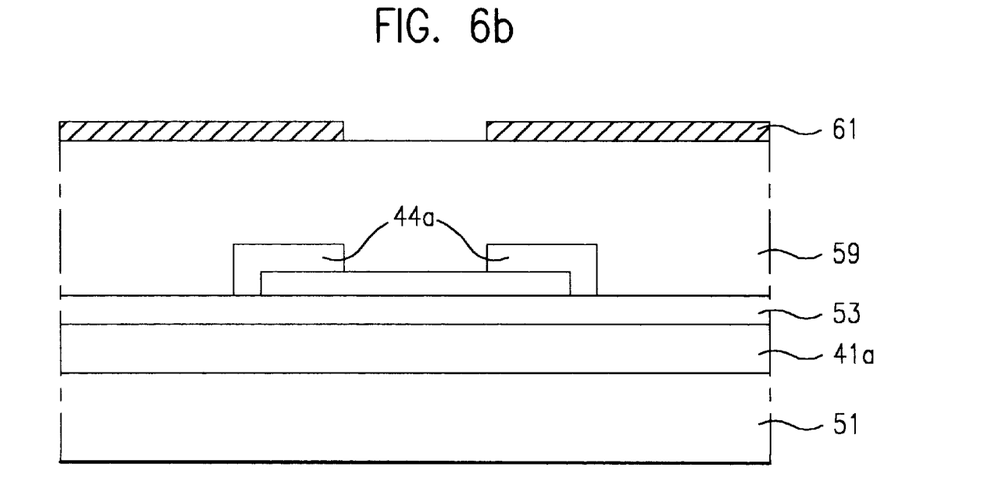

As shown in FIG. 6b (which illustrates a section across line 6b–6b' of FIG. 4d), the parasitic capacitance between the pixel electrode 61 and the data line 44a, where those conductors overlap each other, is reduced by forming a void 44a in the passivation film 59.

As has been explained, because air is included as a portion of an insulating layer disposed between two conductors, resulting in a minimized dielectric constant of the insulating layer, the liquid crystal display and the method for fabricating the liquid crystal display of the present invention can prevent capacitive coupling formed between the two conductors, and thereby improves the picture quality and the reliability of the device.

It will be apparent to those skilled in the art that various modifications and variations can be made in the liquid crystal display and the method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display having a plurality of parallel gate lines, a plurality of parallel data lines formed orthogonal to the gate lines, and a gate insulating layer disposed therebetween, the liquid crystal display comprising:
   an insulating layer formed on an entire surface, inclusive of the data lines, the insulating layer having void regions formed therein at one edge of each of the data lines in the same direction with the data line; and
   a pixel electrode formed on the insulating layer.

2. A liquid crystal display as claimed in claim 1, wherein the insulating layer has void regions formed therein at both edges of each of the data lines in the same direction with the data line.

3. A liquid crystal display as claimed in claim 1, wherein the void regions and the insulating layer are used as a dielectric film between the data lines and the pixel electrode.

4. A liquid crystal display as claimed in claim 1, wherein the void region is filled with air.

5. A liquid crystal display as claimed in claim 1, wherein the void region is a vacuum.

6. A method for fabricating a semiconductor device for reducing capacitance coupling between two conductors, the method comprising the steps of:
   patterning a first conductor on a substrate;
   forming an insulating layer on the first conductor, said insulating layer including an insulating film and a void region; and
   forming a second conductor on the insulating layer.

7. A method as claimed in claim 6, wherein the void region is filled with air.

8. A method as claimed in claim 6, wherein the void region is a vacuum.

9. A method as claimed in claim 6, wherein said step of forming an insulating layer includes the steps of:
   forming a metal layer on a first conductor insulating film, over the metal layer and a conductors, and
   removing the metal layer.

10. A method for fabricating a liquid crystal display comprising the steps of:
    forming a plurality of parallel gate lines inclusive of gate electrodes;
    forming a gate insulating layer on a entire surface of the liquid crystal display, inclusive of the gate electrodes;
    forming a semiconductor layer on the gate insulating layer;
    forming an $n^+$ layer on the semiconductor layer;
    forming a plurality of parallel data lines in a direction orthogonal to the gate lines;
    forming removable lines at edges of the data lines;
    forming an insulating layer on the entire surface of the liquid crystal display inclusive of the removable lines;
    removing the removable lines to form void regions in the insulating layer; and
    forming a pixel electrode on the insulating layer.

11. A method as claimed in claim 10, wherein the removable lines are removed by removing a predetermined portion of the insulating layer overlying the removable lines and injecting an etchant therein.

12. A method as claimed in claim 11, wherein a step for forming a thin film is added for blocking the removed insulating layer after the step of removing the removable line.

13. A method as claimed in claim 12, wherein the thin film is a conductor.

14. A method as claimed in claim 10, wherein the removable lines are metal.

15. A method as claimed in claim 14, wherein the removable lines are removable in reaction with a liquid.

16. A method as claimed in claim 14, wherein the removable lines are removed by wet etching.

17. A method as claimed in claim 10, wherein the removable lines are a non-conductor removable in reaction with a liquid.

18. A method as claimed in claim 10, wherein the insulating layer and the void regions formed in the insulating layer are used as an insulating layer for the data lines and the pixel electrode.

* * * * *